(12) United States Patent
Baum et al.

(10) Patent No.: US 11,663,411 B2
(45) Date of Patent: May 30, 2023

(54) ONTOLOGY EXPANSION USING ENTITY-ASSOCIATION RULES AND ABSTRACT RELATIONS

(71) Applicant: Verint Systems Ltd., Herzliya Pituach (IL)

(72) Inventors: Daniel Mark Baum, Modiin (IL); Uri Segal, Jerusalem (IL); Ron Wein, Ramat Hasharon (IL); Oana Sidi, Ramat Hasharon (IL)

(73) Assignee: Verint Systems Ltd., Herzliya Pituach (IL)

( * ) Notice: Subject to any disclaimer, the term of this patent is extended or adjusted under 35 U.S.C. 154(b) by 22 days.

(21) Appl. No.: 17/225,589

(22) Filed: Apr. 8, 2021

(65) Prior Publication Data
US 2021/0224483 A1 Jul. 22, 2021

Related U.S. Application Data

(63) Continuation of application No. 15/007,703, filed on Jan. 27, 2016, now Pat. No. 11,030,406.
(Continued)

(51) Int. Cl.
*G06F 16/36* (2019.01)
*G06F 40/289* (2020.01)
*G06F 40/284* (2020.01)

(52) U.S. Cl.
CPC ......... *G06F 40/289* (2020.01); *G06F 16/367* (2019.01); *G06F 40/284* (2020.01)

(58) Field of Classification Search
CPC ...... G06F 40/30; G06F 40/284; G06F 40/289; G06F 16/3344; G06F 16/93; G06F 40/20;
(Continued)

(56) References Cited

U.S. PATENT DOCUMENTS 5,317,673 A 5/1994 Cohen et al.
5,737,617 A 4/1998 Bernth et al.
(Continued)

FOREIGN PATENT DOCUMENTS

WO 2000/026795 5/2000

OTHER PUBLICATIONS

Galescu et al., "Bi-directional conversion between graphemes and phonemes using a joint n-gram model", 2001, In4th ISCA Tutorial and Research Workshop (ITRW) on Speech Synthesis 2001, pp. 1-6.*
(Continued)

*Primary Examiner* — Olujimi A Adesanya
(74) *Attorney, Agent, or Firm* — Meunier Carlin & Curfman LLC

(57) ABSTRACT

A method for expanding an initial ontology via processing of communication data, wherein the initial ontology is a structural representation of language elements comprising a set of entities, a set of terms, a set of term-entity associations, a set of entity-association rules, a set of abstract relations, and a set of relation instances. A method for extracting a set of significant phrases and a set of significant phrase co-occurrences from an input set of documents further includes utilizing the terms to identify relations within the training set of communication data, wherein a relation is a pair of terms that appear in proximity to one another.

18 Claims, 7 Drawing Sheets

Related U.S. Application Data

(60) Provisional application No. 62/108,264, filed on Jan. 27, 2015, provisional application No. 62/108,229, filed on Jan. 27, 2015.

(58) Field of Classification Search
CPC ............ G06F 40/205; G06F 16/90332; G06F 40/247; G06F 16/367
See application file for complete search history.

(56) References Cited

U.S. PATENT DOCUMENTS

| | | | |
|---|---|---|---|
| 6,076,088 A | 6/2000 | Paik et al. | |
| 6,385,579 B1* | 5/2002 | Padmanabhan | G10L 15/063 |
| | | | 704/243 |
| 6,434,557 B1 | 8/2002 | Egilsson et al. | |
| 6,542,866 B1 | 4/2003 | Jiang et al. | |
| 6,560,590 B1 | 5/2003 | Shwe et al. | |
| 6,600,821 B1 | 7/2003 | Chan et al. | |
| 6,718,296 B1 | 4/2004 | Reynolds et al. | |
| 7,113,958 B1 | 9/2006 | Lantrip et al. | |
| 7,149,695 B1* | 12/2006 | Bellegarda | G10L 15/1815 |
| | | | 704/E15.024 |
| 7,552,053 B2 | 6/2009 | Gao et al. | |
| 7,734,467 B2 | 6/2010 | Gao et al. | |
| 7,844,459 B2 | 11/2010 | Budde et al. | |
| 7,853,544 B2 | 12/2010 | Scott et al. | |
| 7,904,414 B2 | 3/2011 | Isaacs | |
| 7,912,701 B1 | 3/2011 | Gray et al. | |
| 8,036,876 B2 | 10/2011 | Sanfilippo et al. | |
| 8,078,565 B2 | 12/2011 | Arseneault et al. | |
| 8,160,232 B2 | 4/2012 | Isaacs et al. | |
| 8,190,628 B1 | 5/2012 | Yang et al. | |
| 8,260,809 B2 | 9/2012 | Platt et al. | |
| 8,285,552 B2 | 10/2012 | Wang et al. | |
| 8,447,604 B1 | 5/2013 | Chang | |
| 8,825,488 B2 | 9/2014 | Scoggins et al. | |
| 8,825,489 B2 | 9/2014 | Scoggins et al. | |
| 8,874,432 B2 | 10/2014 | Qi et al. | |
| 9,066,049 B2 | 6/2015 | Scoggins et al. | |
| 9,189,525 B2 | 11/2015 | Acharya et al. | |
| 9,232,063 B2 | 1/2016 | Romano et al. | |
| 9,355,354 B2 | 5/2016 | Isaacs et al. | |
| 9,477,752 B1 | 10/2016 | Romano | |
| 9,569,743 B2 | 2/2017 | Fehr et al. | |
| 9,575,936 B2 | 2/2017 | Romano et al. | |
| 9,633,009 B2 | 4/2017 | Alexe et al. | |
| 9,639,520 B2 | 5/2017 | Yishay | |
| 9,646,605 B2 | 5/2017 | Biatov et al. | |
| 9,697,246 B1 | 7/2017 | Romano et al. | |
| 9,720,907 B2 | 8/2017 | Bangalore et al. | |
| 9,760,546 B2 | 9/2017 | Galle | |
| 9,818,400 B2 | 11/2017 | Paulik et al. | |
| 2002/0032564 A1* | 3/2002 | Ehsani | G10L 15/193 |
| | | | 704/E15.04 |
| 2002/0128821 A1 | 9/2002 | Ehsani et al. | |
| 2002/0188599 A1 | 12/2002 | McGreevy | |
| 2003/0028512 A1 | 2/2003 | Stensmo | |
| 2003/0126561 A1 | 7/2003 | Woehler et al. | |
| 2004/0078190 A1 | 4/2004 | Fass et al. | |
| 2004/0236737 A1 | 11/2004 | Weissman et al. | |
| 2006/0149558 A1 | 7/2006 | Kahn et al. | |
| 2006/0248049 A1 | 11/2006 | Cao et al. | |
| 2007/0016863 A1 | 1/2007 | Qu et al. | |
| 2007/0118357 A1 | 5/2007 | Kasravi et al. | |
| 2008/0021700 A1 | 1/2008 | Moitra et al. | |
| 2008/0154578 A1 | 6/2008 | Xu et al. | |
| 2008/0221882 A1 | 9/2008 | Bundock et al. | |
| 2009/0012842 A1 | 1/2009 | Srinivasan et al. | |
| 2009/0043581 A1 | 2/2009 | Abbott et al. | |
| 2009/0063150 A1* | 3/2009 | Nasukawa | G10L 15/26 |
| | | | 704/E15.006 |
| 2009/0099996 A1 | 4/2009 | Stefik | |
| 2009/0150139 A1 | 6/2009 | Jianfeng et al. | |
| 2009/0204609 A1 | 8/2009 | Labrou et al. | |
| 2009/0254877 A1 | 10/2009 | Kuriakose et al. | |
| 2009/0306963 A1 | 12/2009 | Prompt et al. | |
| 2009/0326947 A1 | 12/2009 | Arnold et al. | |
| 2010/0030552 A1 | 2/2010 | Chen et al. | |
| 2010/0057688 A1 | 3/2010 | Anovick et al. | |
| 2010/0131260 A1 | 5/2010 | Bangalore et al. | |
| 2010/0161604 A1 | 6/2010 | Mintz et al. | |
| 2010/0275179 A1 | 10/2010 | Mengusoglu et al. | |
| 2011/0161368 A1 | 6/2011 | Ishikawa et al. | |
| 2011/0196670 A1 | 8/2011 | Dang et al. | |
| 2012/0016671 A1 | 1/2012 | Jaggi et al. | |
| 2012/0131031 A1* | 5/2012 | Xie | G06F 16/3338 |
| | | | 707/765 |
| 2012/0303356 A1 | 11/2012 | Boyle et al. | |
| 2013/0018650 A1 | 1/2013 | Moore et al. | |
| 2013/0066921 A1 | 3/2013 | Mark et al. | |
| 2013/0132442 A1 | 5/2013 | Tsatsou et al. | |
| 2013/0144616 A1* | 6/2013 | Bangalore | G10L 15/197 |
| | | | 704/226 |
| 2013/0166303 A1 | 6/2013 | Chang et al. | |
| 2013/0260358 A1 | 10/2013 | Lorge et al. | |
| 2014/0040275 A1 | 2/2014 | Dang et al. | |
| 2014/0040713 A1 | 2/2014 | Dzik et al. | |
| 2014/0075004 A1 | 3/2014 | Van Dusen et al. | |
| 2014/0143157 A1 | 5/2014 | Jeffs et al. | |
| 2014/0222419 A1 | 8/2014 | Romano et al. | |
| 2014/0297266 A1 | 10/2014 | Nielson et al. | |
| 2015/0032746 A1* | 1/2015 | Lev-Tov | G06F 16/243 |
| | | | 707/769 |
| 2015/0066503 A1 | 3/2015 | Achituv et al. | |
| 2015/0066506 A1* | 3/2015 | Romano | G10L 15/1822 |
| | | | 704/235 |
| 2015/0074124 A1 | 3/2015 | Sexton et al. | |
| 2015/0127652 A1 | 5/2015 | Romano | |
| 2015/0169746 A1 | 6/2015 | Hatami-Hanza | |
| 2015/0170040 A1 | 6/2015 | Berdugo et al. | |
| 2015/0193532 A1 | 7/2015 | Romano | |
| 2015/0220618 A1 | 8/2015 | Horesh et al. | |
| 2015/0220626 A1 | 8/2015 | Carmi et al. | |
| 2015/0220630 A1 | 8/2015 | Romano et al. | |
| 2015/0220946 A1 | 8/2015 | Horesh et al. | |
| 2016/0055848 A1 | 2/2016 | Meruva et al. | |
| 2016/0078016 A1 | 3/2016 | Ng Tari et al. | |
| 2016/0078860 A1 | 3/2016 | Paulik et al. | |
| 2016/0117386 A1 | 4/2016 | Ajmera et al. | |
| 2016/0180437 A1 | 6/2016 | Boston et al. | |
| 2016/0217127 A1 | 7/2016 | Segal et al. | |
| 2016/0217128 A1 | 7/2016 | Baum et al. | |

OTHER PUBLICATIONS

Saon et al, "Data-driven approach to designing compound words for continuous speech recognition.", 2001,EEE transactions on Speech and audio processing. May 2001;9(4):327-32.*

Chen, S.F., et al, "An Empirical Study of Smoothing Techniques for Language Modeling," Computer Speech and Language, vol. 13, 1998, 62 pages.

Coursey, K., et al., "Topic identification using Wikipedia graph centrality," Proceedings of the 2009 Annual Conference of the North American Chapter of the Association for Computational Linguistics, Human Language Technologies, Short Papers, 2009, pp. 117-120.

Federico, M., et al., "IRSTLM: an Open Source Toolkit for Handling Large Scale Language Models," Ninth Annual Conference of the International Speech Communication Association, 2008, pp. 1618-1621.

Král, Pavel, et al., "Dialogue Act Recognition Approaches," Computing and Informatics, vol. 29, 2010, pp. 227-250.

Kumar, N., et al., "Automatic Keyphrase Extraction from Scientific Documents Using N-gram Filtration Technique," Proceedings of the 8$^{th}$ ACM symposium on Document engineering, 2008, pp. 199-208.

Mikolov, T., et al., "Efficient Estimation of Word Representations in Vector Space," Proceedings of the International Conference on Learning Representations (ICLR), arXiv:1301.3781v3, 2013, 12 pages.

(56) References Cited

OTHER PUBLICATIONS

Ponte, J.M., et al., "Text Segmentation by Topic," Computer Science Department, University of Massachusetts, Amherst, 1997, 13 pages.
Ramos, J., "Using TF-IDF to Determine Word Relevance in Document Queries," Proceedings of the First Instructional Conference on Machine Learning, 2003, 4 pages.
Rosenfeld, R. "The CMU Statistical Language Modeling Toolkit and its use in the 1994 ARPA CSR Evaluation," Proceedings of the Spoken Language Systems Technology Workshop, 1995, pp. 47-50.
Stolcke, A., et al., "Automatic Linguistic Segmentation of Conversational Speech," IEEE, vol. 2, 1996, pp. 1005-1008.
Stolcke, A., "SRILM—An Extensible Language Modeling Toolkit," Seventh International Conference on Spoken Language Processing, 2002, 4 pages.
Zimmermann, M., et al., "Joint Segmentation and Classification of Dialog Acts in Multiparty Meetings," Acoustics, Speech and Signal Processing, 2006, pp. 581-584.

* cited by examiner

ONTOLOGY EXPANSION USING ENTITY-ASSOCIATION RULES AND ABSTRACT RELATIONS

CROSS-REFERENCE TO RELATED APPLICATION

The present application is a continuation of U.S. patent application Ser. No. 15/007,703, filed on Jan. 27, 2016, and entitled "ONTOLOGY EXPANSION USING ENTITY-ASSOCIATION RULES AND ABSTRACT RELATIONS", which claims priority to U.S. Provisional Patent Application Ser. No. 62/108,264, filed Jan. 27, 2015 and U.S. Provisional Patent Application Ser. No. 62/108,229, filed Jan. 27, 2015. The disclosures of the above referenced applications are all incorporated herein by reference.

BACKGROUND

The present disclosure relates to the field of automated data processing, and more specifically to the application of ontology programming to process and analyze communication data. In the realms of computer and software sciences and information science, an ontology is a structural framework for organizing information regarding knowledge and linguistics within a domain. The ontology represents knowledge within a domain as a hierarchical set of concepts, and the relationships between those concepts, using a shared vocabulary to denote the types, properties, and interrelationship of those concepts. For example, the ontology models the specific meanings of terms as they apply to that domain.

SUMMARY

Methods are disclosed herein for expanding an initial ontology via processing of communication data, wherein the initial ontology is a structural representation of language elements comprising a set of entities, a set of terms, a set of term-entity associations, a set of entity-association rules, a set of abstract relations, and a set of relation instances. An exemplary method includes providing the initial ontology, providing a training set of communication data, processing the training set of communication data to extract significant phrases and significant phrase pairs from within the training set of communication data, creating new abstract relations based on the significant phrase pairs, creating new relation instances that correspond to the significant term pairs, storing the significant phrases as ontology terms ontology and associating an entity for the added terms, and storing the new relation instances and new abstract relations to the initial ontology.

Also disclosed herein is a method for extracting a set of significant phrases and a set of significant phrase co-occurrences from an input set of documents. An exemplary method includes providing a generic language model and providing the set of documents. The exemplary method extracts a set of significant phrases by, for example, generating a source-specific language model by subdividing each document into meaning units, accumulating phrase candidates by creating a set of candidates where each candidate is an n-gram and integrating over the n-grams to compute a prominence score for each n-gram and a stickiness core, and filtering the candidate phrases by calculating a frequency for each of the candidate phrases and calculating an overall phrase score for each of the candidate phrases. The exemplary method can extract significant phrase co-occurrences by, for example, iterating over the meaning units and locating the occurrences of individual phrases, counting the number of co-occurrences of pairs of phrases in the same meaning unit, computing a probability of a phrase and a probability of the co-occurrence of a pair of phrases based on the count, calculating a log-likelihood of the co-occurrence using the probability of the phrase and the probability of the co-occurrence of a pair of phrases and identifying a significant co-occurrence of the pair of phrases if the log-likelihood is over a predetermined log-likelihood threshold.

The details of one or more embodiments of the disclosure are set forth in the accompanying drawings and the description below. Other features, objects, and advantages of the disclosure will be apparent from the description, drawings, and from the claims.

DETAILED DISCLOSURE

Figure 1:
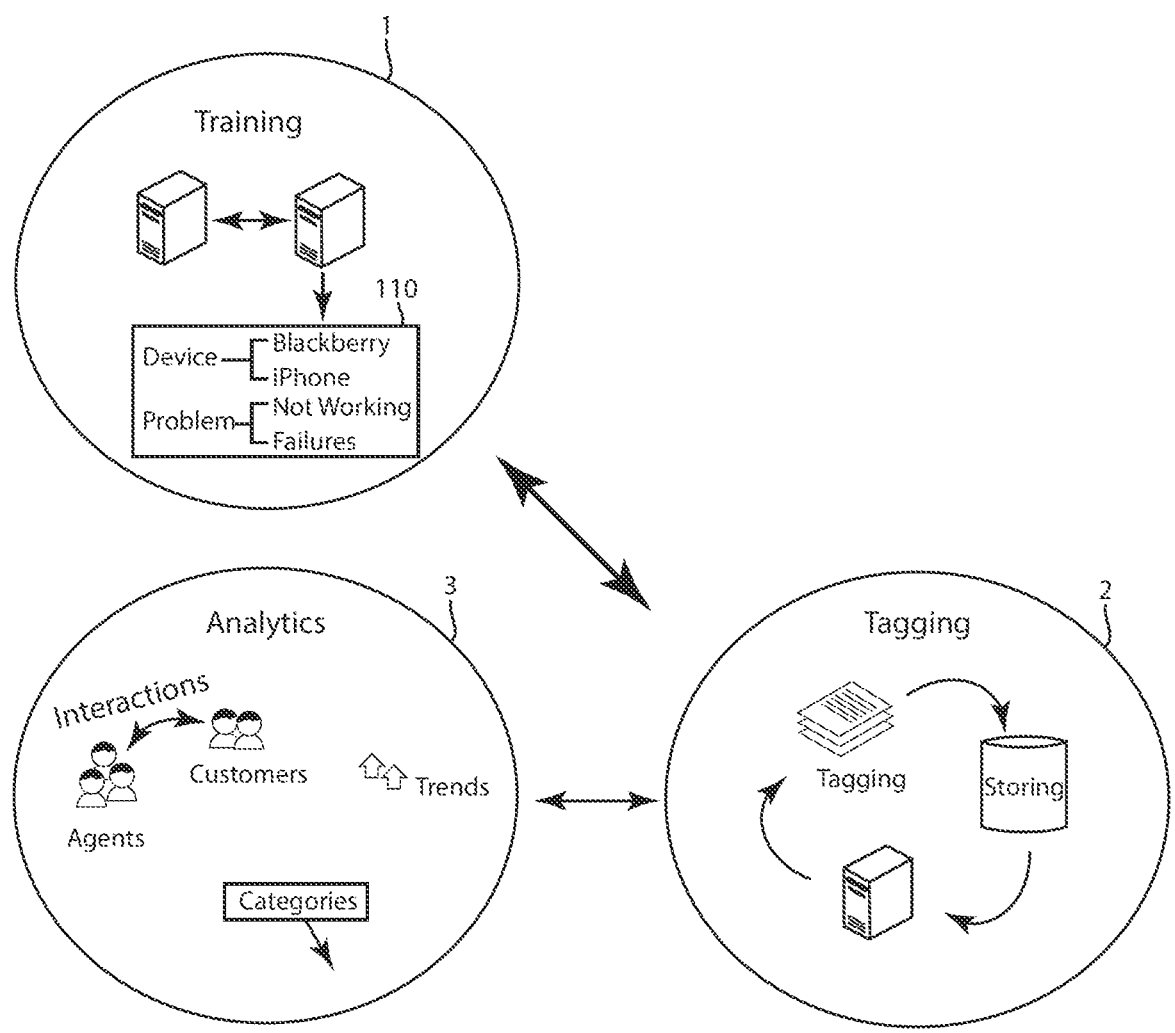
FIG. 1 depicts an exemplary embodiment of the ontology process and programming disclosed herein.

According to the present invention, an ontology may be developed and applied across all types of communication data, for example, all types of customer interactions (which may include interactions in multiple languages) as a tool for processing and interpreting such data. The communication data may document or relate to any type of communication, including communications made via phone, via email, via internet chat, via text messaging, etc. For example, communication data may contain any spoken content or any written correspondence or communication, including but not limited to live speech, audio recording, streaming audio, transcribed textual transcripts, or documents containing written communications, such as manuscripts, web pages, email, physical mail, text messages, chats, etc. In the exemplary context of a customer service application, the communication data may be between a customer service agent or an automated system, such as an interactive voice response (IVR) recording, and a customer or caller. While the present disclosure is often exemplified herein by describing an embodiment involving the analysis of audio data, such as recorded audio transcripts, it is to be understood that in alternative embodiments other forms of oral or written communications may be used or analyzed. A particular ontology may be defined for and applied to any domain, and other examples include financial services, consumer products, subscription services, or some other business application involving communication data interactions.

In the generation, refinement, or development of an ontology, repeating patterns are identified and ranked based upon statistical significances and then clustered into terms and term relationships. The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the business environment by processing and analyzing a corpus of communication data.

The disclosed ontology programming, once built and refined for a specific business application, is applied to process communication data to provide valuable analytics for a variety of business needs. For example, the ontology programming can then be utilized to detect and surface meaningful items in a data set, such as a database of recorded employee-customer interactions, and can mine the data set to extract and analyze business data based on an enhanced formulization of a company's internal knowledge and terminology.

An exemplary embodiment of the presently disclosed ontology solution incorporates three main stages. As seen in FIG. 1, the three main stages include training 1, ontology tagging 2, and ontology analytics 3. The training phase 1 involves internal machine learning in which the system learns the customer's specific domain and formulates an initial ontology 110. The initial ontology 110 is then passed to the tagging module 2. Tagging is a continuous online process that uses the ontology to tag tracked items in incoming interactions, and stores the tagged interactions in a persistent repository. Finally, the tagged interactions are then used by the analytics module 3 to analyze and extract business data based on an enhanced formulization of a company's internal knowledge and terminology. A detailed analysis of each stage is addressed in turn. In certain embodiments, the ontology tagging phase 2 and/or the ontology analytics phase 3 can be optional.

Generally, an ontology as $O$ as disclosed herein can be defined as $\langle \mathcal{E}, \mathcal{T}, \mathcal{Z}, \mathcal{X}, \mathcal{A}, \mathcal{R} \rangle$, wherein ε is a set of entities, $\mathcal{T}$ is a set of terms, $\mathcal{Z}$ is a set of term-entity associations, $\mathcal{X}$ is a set of entity-association rules, in which, $\mathcal{A}$ is a set of abstract relations, and $\mathcal{R}$ is a set of relation instances. Terms are individual words or short phrases that represent the basic units or concepts that might come up in the communication data. Thus a set of terms $\mathcal{T}$ can be defined as a word n-gram that has some meaning. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. In certain embodiments, all words in the corpus, or set of communication data, can only be associated with one term, and each term can only be counted once.

Development of an ontology involves the identification of term candidates. A set of communication data used for training purposes is divided into potential terms, or term candidates. Terms are then selected from those term candidates. Strong term candidates contain words or word sets that are compact and, in the instance of word sets, the frequency of finding the word set together is very high. An example of a term containing a word set is "credit card number," as those words very often appear together and refer to a particular, defined object. In addition, good terms often contain words that make more conceptual sense when they are together, as opposed to being on their own. For example, the term "Nova Scotia" is comprised of words that make sense when found together, and would likely not appear or make sense separately.

The frequency that the words of a particular word set, or term, appear together may be referred to as the "stickiness" of the term. A "sticky" term is one whose words appear frequently appear together in the corpus. The higher the stickiness ranking, the stronger the term, as it means that the term has meaning in the corpus as a concept. Salient terms are those that stand out or have a higher score relative to similar or neighboring terms. Non-salient terms and less-salient terms are those that appear many times or a relatively large number of times in many different contexts. The score of such non-salient or less-salient terms is lowered as compared to the score for salient terms. The logic is that salient terms are likely to be meaningful as a concept, whereas non-salient terms are not likely to express a particular concept. For example, the score of the term "account number" would be higher than the score of the term "the account number" because the word "the" appears in many different contexts and also by itself. Therefore, the word "the" does not add any significant meaning when joined with the term "account number."

Entities are broader concepts that encapsulate or classify a set of terms. Entities describe semantic concepts to which classified terms are related. Non-limiting examples of classes, may include "objects", "actions", "modifiers", "documents", "service", "customers", or "locations". However, these are not intended to be limiting on the types of entities, particularly the types of entities that may appear in an ontology directed to a specific or specialized domain. Thus a set of entities ε can be organized in a hierarchical tree-like structure, where for each entity E∈ε, let π(E) be the parent entity of E.

The set of entities and terms in the ontology are connected by a set of term-entity associations $\mathcal{Z} \subseteq \mathcal{T} \times \mathcal{T}$ governed by entity-association rules $\mathcal{X} \subseteq \varepsilon \times \varepsilon \times (\varepsilon \cup \{\bar{0}, \bar{1}, \bar{2}\})$. Each term in the ontology is associated with at least one entity, namely $\forall T \exists E \ \langle T, E \rangle \in \mathcal{Z}$. In some embodiments it is possible for a term to have multiple entity associations. For example, if the term is "jaguar", the term may be associate with the entity "Animal" and with the entity "CarBrand." The distance between a term T and E, denoted d(T, E) is 0 in case $\langle T, E \rangle \in \mathcal{Z}$. Alternatively, if there exists an entity E' such that $\langle T, E' \rangle \in \mathcal{Z}$ and E is an ancestor of E', then d(T,E)=d(E',E); in either of these two cases, T<E. Otherwise, d(T,E)=∞.

Abstract relations express relations between two ontology entities. A set of abstract relations can be defined as $\mathcal{A} \subseteq \varepsilon \times \varepsilon$. The distance between two entities $E_1, E_2 \in \varepsilon$ in the hierarchy chain, denoted d $(E_1, E_2)$, can be defined as the number of steps down or up the hierarchy of entities. For example, if $E_1$ is an ancestor of $E_2$ then $d(E_1, E_2)$ is defined as the number of steps down the hierarchy, whereas if $E_2$ is an ancestory of $E_1$ then then $d(E_1, E_2)$ is defined as the number of steps up the hierarchy of entities. If none of these conditions apply however, then $d(E_1, E_2)=\infty$.

Relation instances express relations between ontology terms. A set of relation instances can be defined as $\mathcal{R} \subseteq \mathcal{Z} \times \mathcal{Z}$. For example, the term "pay" may be related to the term "bill" to form the relation "pay>bill." In another non-limiting example, the term "pay" may be associated under the entity "action" and the term "bill" may be defined in the entity "documents". Still further binary directed relationships can be defined between these entity/term pairs. For example, the action/pay pair may be related to the document/bill pair in that the payment action requires an underlying document, which may be a bill. In another non-limiting example, the term "broken" may be defined in the entity "problems" and the term "iPhone" may be defined in the entity "device". The problem/broken pair can also have a directed relationship to the "devices" entity in which the "iPhone" term is a specific example as represented by the devices/iPhone pair.

Figure 2:
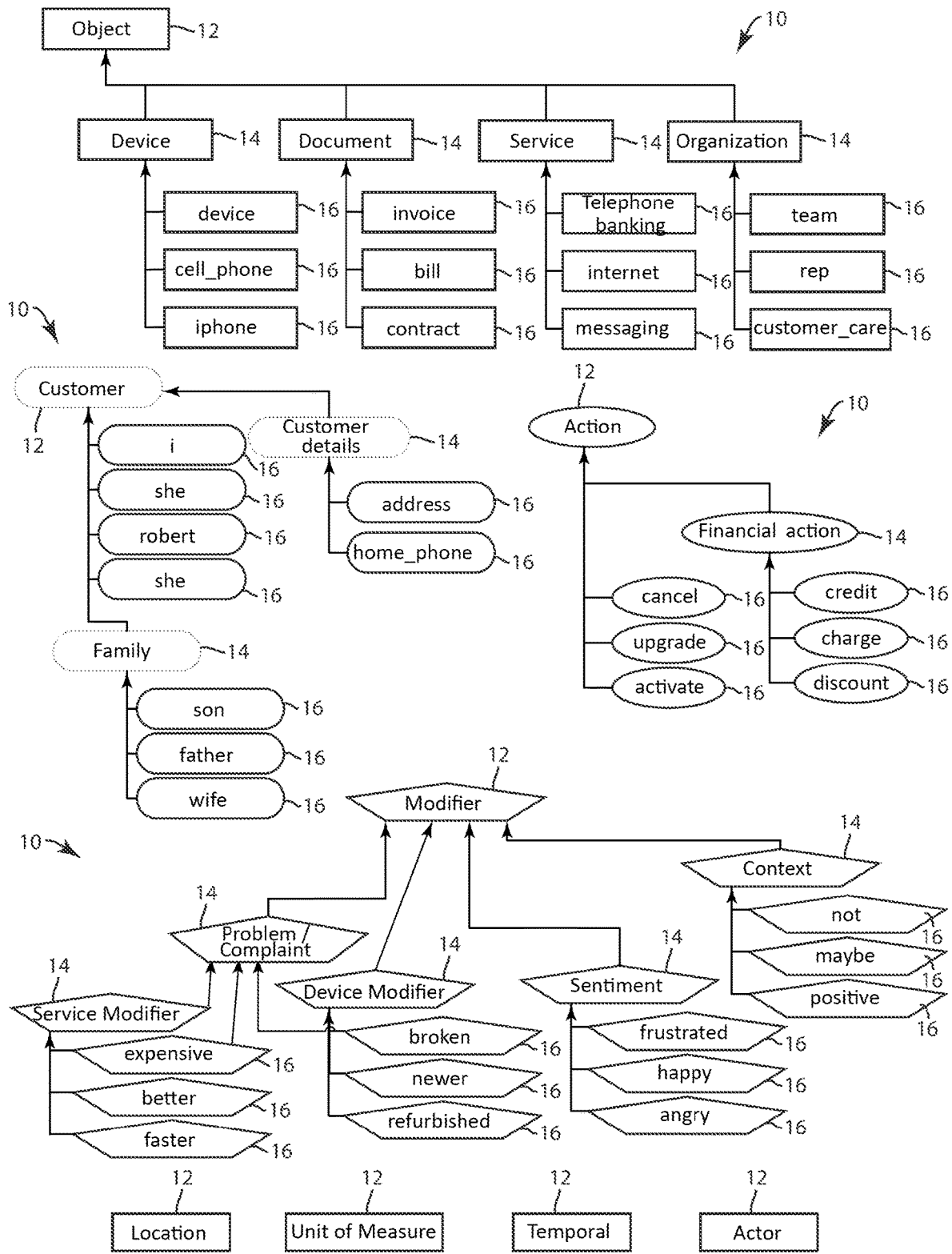
FIG. 2 depicts examples of hierarchical presentations of ontologies refined according to the disclosed process.

FIG. 2 depicts exemplary, non-limiting embodiments of a portion an ontology 10, including entities 12 and 14, and terms 16. The arrows between the terms and entities represent some relations that may exist in the depicted portion of the exemplary ontology.

Figure 3:
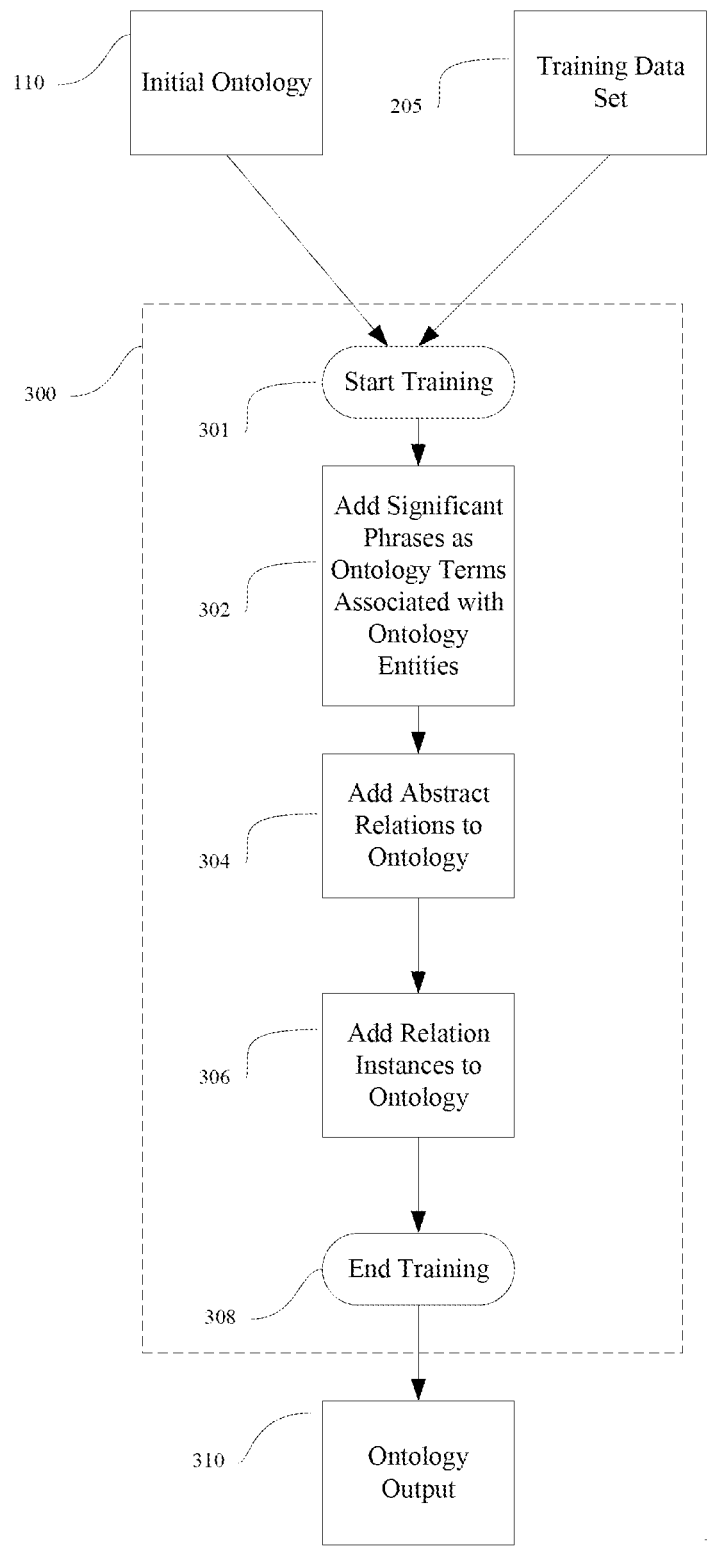
FIG. 3 is a schematic diagram of an embodiment of a process for ontology refinement.

FIG. 3 represents an overview of an exemplary training phase 1 for refining an initial ontology 110. The initial ontology 110 is refined by a step-by-step pipeline process that applies various features to the defined data. These features include the extracting and surfacing of words and phrases in the corpus that helps users make non-trivial observations about a customer-specific domain.

As exemplified in FIG. 3, the ontology training process begins with an initial ontology 110. In certain embodiments, the initial ontology can be a canned ontology. A canned ontology is an ontology that is developed for a particular business application or sector—a unique language model that reflects, or fits, the relevant business application. For example, a canned ontology may be developed for telecommunications applications, and the telecom canned ontology would differ from that developed for insurance industry applications, which would differ from the canned ontology developed for the finance industry, etc. A user, or company, in a particular industry may begin the training process by implementing one or more relevant canned ontologies. The canned ontology is then refined during the ontology training phase 1 (FIG. 1), to develop a specialized ontology for that particular user. If a user starts the training process by implementing more than one canned ontology, the canned ontologies are preferably unified during the ontology training phase 1, so that one, unified and encompassing ontology structure is developed for the user.

A canned ontology can be developed in various ways. For example, a canned ontology may be developed by taking data samples generated by multiple different users or classes in a particular industry. Alternatively, a canned ontology may be created by combining multiple ontologies developed using sample data sets from a particular industry. For example, multiple users may develop an ontology for their particular business based on their own internal data. Those individual ontologies may then be combined through a process of comparison, wherein the common elements in the ontologies receive heavier weight than the elements that differ. In still other embodiments, a canned ontology could be developed over a series of training processes where one user develops an ontology based on its data, and then the next user uses the first user's ontology as a canned ontology input to its training process. Thereby, each subsequent user implements a previous user's output ontology as a canned ontology 201 input, and amends or refines that canned ontology through the training process to develop its own ontology.

In FIG. 3, after an initial ontology 110 is obtained, for example a canned ontology, the initial ontology 110 is refined using a developed training data set 205. Training data set 205 can be developed by, for example, accumulating data for each planned ontology that contains a range of communications sufficient to be representative of the language and linguistic structure of that domain. In certain embodiments, the training data set 205 contains various types of data and originates over a sufficiently long time period, for example, between about a month previous to the date of implementing the training step up until the most recent available data at the time of execution of the training. The training data set 205 may include data from a single platform, such as transcriptions of customer service phone calls, or it may include data from multiple platforms, such as customer service calls, emails, web chats, text messages, web page comments, facebook or twitter interactions, customer surveys, etc (e.g., see FIG. 7). In still other embodiments, the sample data set includes other types of business documents such as, but not limited to, white papers, user manuals, service manuals, or catalogs.

In certain of the embodiments, the ontology training phase 1 is not executed until a certain, predefined amount of data is gathered for the training. In one embodiment, a configured scheduler may monitor the data gathering process and count the number of records or amount of data added. When the number of records or amount of data in the training data set 205 reaches that predetermined amount, the scheduler may execute the ontology training process 1. Alternatively or additionally, the scheduler may monitor the types and/or variety of data added to the training data set 205 so as to ensure that the training 301 does not begin until certain types and/or varieties of data are available to the training set. In certain embodiments, the communication data is transformed into a usable format as part of training phase 1. For example, audio data from one or more customer interactions between a customer service agent/IVR and a customer/caller can be automatically transcribed into a textual file through speech recognition techniques, and the textual file can be processed as described herein to refine an ontology.

Once one or more initial ontologies 110 are selected and a training data set 205 is developed, the training phase 1 continues by executing a training module 300, example of which is depicted in FIG. 3. In general, training module 300 is an automated process that accepts an initial ontology and a set of text documents, gives scores to the existing ontology components based on their relevance to the text documents, and enriches the initial ontology with additional terms, abstract relations and relation instances that are characteristic to those documents.

Figure 4:
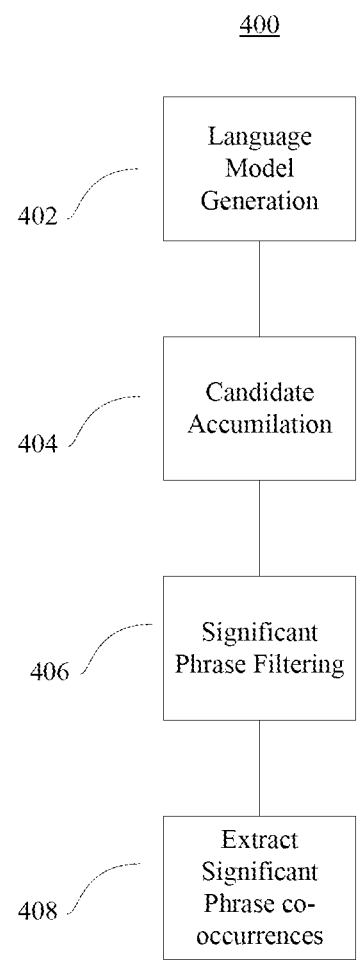
FIG. 4 is schematic diagram of an embodiment of a process for extracting significant phrases and significant phrase co-occurrences.

Starting with the embodiment of FIG. 3, at step 301, the initial ontology 110 and training data set 205 and are is fed into the training module 300. In certain embodiments, the training module 300 then extracts a set of significant phrases and significant phrase pairs from the training data set 205, by executing, for example, method 400 as shown in FIG. 4, which is described in further detail below. In alternative embodiments, the set of significant phrases and significant phrase pairs are entered manually by a user and then used by training module 300 is the subsequent steps below.

After the set of significant phrases and significant phrase pairs are obtained whether through method 400 or manually, the significant phrases are then added as ontology terms to the initial ontology 110 and associated with ontology entities at step 302. As used herein, a phrase $\phi=<w_1, \ldots w_n>$ comprises a sequence for words. It can be said that a term T' that comprises the word sequence $<w'_1, \ldots, w'_k>$ is contained in $\phi$, and denoted by $T' \subset \phi$, if $k \leq n$ and there exists some index i such that: $w_i = w'_1, \ldots, w_{i+k-1} = w'_k$. A pair of terms T', T" are mutually contained in $\phi$, if both are contained in $\phi$ (namely T', T" $\subset \phi$) with no overlap between them, namely T'∩T"=∅.

In certain exemplary embodiments, given a set of phrases $\Phi$, training module 300 performs step 302 by sorting the phrases according to their length (shorter phrases are processed first), and then for each $\phi \in \Phi$, and performing the following:

1. If there exists a term $T \in \mathcal{T}$ comprising a word sequence that is identical to $\phi$, there is no need to further process this phrase.
2. If there exists $T_1, T_2 \in \mathcal{T}$ that are mutually contained in $\phi$, and there exists $<E_1, E_2> \in \mathcal{A}$ such that $T_1 \prec E_1$ and $T_2 \prec E_2$—then this phrase contains a relation instance, and there is no need to further process it.
3. Iterate over all entity-association rules $\mathcal{X}$, and compute:

$$X^* = \underset{\langle E_1, E_2, \tilde{E} \rangle \in \mathcal{X}}{\operatorname{argmin}} \{d(T_1, E_1) + d(T_2, E_2) \mid T_1, T_2 \subset \phi \wedge T_1 \cap T_2 = \emptyset\}$$

Namely, identify the most specific rule in $\mathcal{X}$ that corresponds to the phrase. If no such rule exists, discard the phrase $\phi$. Otherwise, act according to the third component $\tilde{E}$ in the tuple that comprises the rule X* (recall that $\tilde{E} \in \varepsilon \cup \{\tilde{0}, \tilde{1}, \tilde{2}\}$):

If $\tilde{E} = \tilde{0}$, discard the phrase $\phi$.

If $\tilde{E} = \tilde{1}$, add a new term T* into $\mathcal{T}$ that corresponds to $\phi$, and add a term-entity associations $\langle T^*, E_1 \rangle$ into $\mathcal{Z}$, where $E_1$ is the entity of the first contained sub-term with respect to the rule X*, namely $T_1$.

If $\tilde{E} = \tilde{2}$, add a new term T* into $\mathcal{T}$ that corresponds to $\phi$, and add a term-entity associations $\langle T^*, E_2 \rangle$ into $\mathcal{Z}$, where $E_2$ is the entity of the second contained sub-term with respect to the rule X*, namely $T_2$.

Otherwise, $\tilde{E} \in \varepsilon$, so add a new term T* into $\mathcal{T}$ that corresponds to $\phi$, and add the term-entity associations $\langle T^*, \tilde{E} \rangle$.

Following step 302, at step 305 new abstract relations are then added to the initial ontology 110 using the obtained set of significant phrase pairs. As used herein, the set of significant phrase pairs are denoted $\Psi \subseteq \Phi \times \Phi$, where $\omega: \Psi \to \mathbb{R}^+$ is a scoring function that associates a score to a phrase pair.

In certain exemplary embodiments, training module 300 performs step 304 in the following way:

1. Define a weight function W: $\varepsilon \times \varepsilon \to \mathbb{R}^+$. Initially, $W(E_1, E_2) \leftarrow 0$ for each pair of entities $<E_1, E_2>$.
2. Iterate over all pairs $<\phi_1, \phi_2> \in \Psi$. If there exists $T_1, T_2 \in \mathcal{T}$ that correspond to $\phi_1, \phi_2$, respectively, iterate over all entity pairs $<E_1, E_2>$ such that $T_1 \prec E_1$ and $T_2 \prec E_2$, and update their weight as follows:

$$W(E_1, E_2) \leftarrow W(E_1, E_2) + \frac{\omega(\phi_1, \phi_2)}{\sqrt{d(T_1, E_1) \cdot d(T_2, E_2)}}$$

3. Finally, iterate over all entity pairs $<E_1, E_2>$ that are not already contained in the set of abstract relations $\mathcal{A}$, and do the following:

If there exists an abstract relation $<E'_1, E'_2> \in \mathcal{A}$ such that $E'_1$ is an ancestor of $E_1$ and $E'_2$ is an ancestor of $E_2$ (namely, if $<E_1, E_2>$ refines an existing abstract relation), and $W(E_1, E_2) > W_R$ (where $W_R$ is a parameter that serves as a weight threshold for refining abstract relations), add a new abstract relation $<E_1, E_2>$ into $\mathcal{A}$.

Otherwise, if $W(E_1, E_2) > W_N$ (where $W_N > W_R$ is a parameter that serves as a weight threshold for completely new abstract relations), add a new abstract relation $<E_1, E_2>$ into $\mathcal{A}$.

After adding the new abstract relations to the ontology at step 304, training module 300 then adds new relation instances to the ontology based on the significant phrase pairs $\Psi$ and the scoring function $\psi: \Psi \to \mathbb{R}^+$ at step 306. Training module 300 performs step 304 in for example, the following way: Iterate over all pairs $<\phi_1, \phi_2> \in \Psi$. If there exists $T_1, T_2 \in \mathcal{T}$ that correspond to $\phi_1, \phi_2$, respectively, compute an entity pair $<E_1^*, E_2^*>$ such that:

$$\langle E_1^*, E_2^* \rangle = \underset{\langle E_1, E_2 \rangle \in \mathcal{A} \mid T_1 \prec E_1 \wedge T_2 \prec E_2}{\operatorname{argmin}} \{d(T_1, E_1) + d(T_2, E_2)\}$$

Namely, select the most specific abstract relation $<E_1^*, E_2^*>$ that corresponds to the term pair $\langle T_1, T_2 \rangle$.

If no such abstract relation exists, discard the term pair. Otherwise, if $\omega(\phi_1, \phi_2) > \tau$ ($\tau$ is a parameter), add the relation instance $<\langle T_1, E_1^* \rangle, \langle T_2, E_2^* \rangle>$ into $\mathcal{R}$.

Upon completion of the adding of new relation instances at step 306, the training phase 1 may be completed 308 and the training module 300 may output and store the refined ontological structure at step 310, which is a refined version of the initial ontology 110 referred to in the discussion of FIG. 1. Optionally, the output ontology can be updated and further refined through a new ontology training 1. For example, a training phase 1 may be initiated every week, month, year, etc. The new training phase may use the existing ontology as a "canned ontology" of sorts, and may use a recent training data set generated in a defined recent period. For example, if a new training phase is scheduled to occur every month to update an existing ontology, then the training data set would preferably include data collected during the most recent month. Thus, the training process 1 will update the existing ontology to incorporate, for example, new terms, term-entity associations, abstract relations, and relation instances. Thereby, the ontology is automatically updated to keep up with the changes that occur in the company, the industry, the customers, etc.

FIG. 4 depicts a schematic diagram of an exemplary process 400 for extracting a set of significant phrases and a set of significant phrase co-occurrences from an input set of text documents. Given a large collection of text documents that originate from a common source or are related to a certain domain, the exemplary process 400 identifies the phrases in the collection that carry some significance to a specific domain and identifies pairs of phrases that tend to co-occur in the collection. Such documents may include articles that are taken from a journal, social media posts of a specific group, for example. Such documents may even include texts obtained by transcribing audio recording for a specific company.

Exemplary method 400 beings by accepting as inputs a generic language model $L_G$ and a set of documents, wherein generic model $L_G$ is a model that is supposed to model the language distribution of generic texts that are not specific to the common source or its associated field of interest.

For ease of description and conception, the exemplary process 400 is divided into four exemplary phases 402, 404, 406, and 408, three of which can be used for the extraction of significant phrases 402, 404, and 406, and one of which can be used in for the extraction of significant phrase co-occurrences. However, such divisions are not intended to be a limiting of the embodiment or the invention. In certain embodiments not all of the phases need be performed.

In regards to the extraction of a set of significant phrases, an exemplary method 400 can include, for example: first, exemplary language-model generation phase (step 402); second, exemplary candidate accumulation phase (step 404), and third, exemplary significant phrase filtering phase (step 406).

As used, $L(w_1, \ldots, w_m)$ denotes the log-probability of the word sequence $w_1, \ldots w_m$, as induced by the language model L. For example, if L is a trigram model this log-probability can be expressed as:

$$L(w_1, \ldots, w_m) = \log_{10}\left(p(w_1) \cdot p(w_2 \mid w_1) \cdot \prod_{k=3}^{n} p(w_k \mid w_{k-2}, w_{k-1})\right)$$

The language-model generation phase step 402 can include, or example, iterating over the input documents and subdividing each document into meaning units. Meaning units are sequences of words that express an idea. In the context of spoken or informal communications, the meaning unit may be the equivalent of a sentence. Meaning units can divide scripts or utterances into a basic segments of meaning or the equivalent of a sentence, when narrated text is compared to written text. A meaning unit may be a sequence of words spoken by one speaker in a conversation without interference. A non-limiting example of a meaning unit in a customer service context would be the customer statement "I would like to buy a phone." In some embodiments, the meaning unit may include some level of speaker interference, e.g. very short acknowledgement statements by the other speaker. All terms in the meaning unit are linked within the boundaries of the meaning unit. In certain embodiments the subdividing above is induced by punctuation marks. However, if the input texts are generated by transcribing audio data, the subdividing can be performed using a zoning algorithm; see for example the zoning algorithm described in U.S. Pat. No. 14,467,783.

Once the meaning units have been subdivided, the Language-model generation phase (step 402) can process each of the meaning units and count the number of n-grams up to some predetermined order (unigrams, bigrams, trigrams, etc.). An order of 3 or 4 has been seen to yield good results. Once the number of n-grams are counted, language-model probabilities can be estimated based on the given counters, and a source-specific language model $L_s$ can be obtained. One suitable way of obtaining source-specific language model $L_s$, is by a applying a suitable smoothing technique; see, for example: S. F. Chen and J. Goodman, *An empirical study of smoothing techniques for language modeling, in Computer Speech and Language* (1999) volume 13, pages 359-394.

In an exemplary candidate accumulation phase (step 404), a set of candidates $C$ are created, where each candidate is an n-gram (a sequence of n words), and its respective number of occurrences stored. For example, once that the input text documents have been subdivided into meaning units, the following can be performed for each meaning unit:

For each $1 \leq n \leq n_{max}$ ($n_{max}$ is the maximal number of words per phrase):

Iterate over all n-grams in the meaning unit. Let $\langle w_1, \ldots, w_n \rangle$ be the words in the current n-gram:

1. Compute the prominence score for the n-gram:

$$P(w_1, \ldots, w_n) = \frac{1}{n} \cdot (L_S(w_1, \ldots, w_n) - L_G(w_1, \ldots, w_n))$$

2. If $P(w_1, \ldots, w_n) < \tau_P$ (where $\tau_P$ is a prominence threshold), discard the n-gram.
3. Otherwise:
   If n=1, store the unigram (namely, if the unigram is already in $C$, increment its occurrences counter—and otherwise insert it into $C$ with a single occurrence).
   if n>1, compute-the-stickiness score for the n-gram:

$$S(w_1, \ldots, w_n) = \\ L_S(w_1, \ldots, w_n) - \max_{1 \leq k < n}\{L_S(w_1, \ldots, w_k) + L_S(w_{k+1}, \ldots, w_n)\}$$

If $S(w_1, \ldots, w_n) < \tau_S$ (where $\tau_S$ is a stickiness threshold), discard the n-gram.

Check if there exists in $C$ a partially overlapping m-gram $\langle u_1, \ldots, u_m \rangle$ that has a significantly higher significance score than $\langle w_1, \ldots, w_n \rangle$, namely ($\tau_O$ is a threshold):

$$S(u_1, \ldots, u_m) - S(w_1, \ldots, w_n) > \tau_O$$

If so, discard the n-gram.
Otherwise, store the n-gram in $C$.

Once the candidate accumulation phase (step 404) is completed, the significant phrase filtering phase (step 406) can calculate a phase score for each candidate phrase and then keep only those phrases whose score is above a threshold. The candidate accumulation phase (step 404) can be performed by, for example, integrating over the n-grams in $C$, let $f(w_1, \ldots, w_n)$ be the frequency of the phrase $\langle w_1, \ldots, w_n \rangle$, which can be computed by the counter stored at $C$ normalized by the total number of words encountered in all text documents. The overall phrase score for the candidate $\langle w_1, \ldots, w_n \rangle$ can computed in, for example, the following manner:

$$\Phi(w_1, \ldots, w_n) = \alpha_P \cdot P(w_1, \ldots, w_n) + \alpha_S \cdot S(w_1, \ldots, w_n) + \alpha_f \log f(w_1, \ldots, w_n)$$

The significant phrase filtering phase 406 only keeps those phrases for which $\Phi(w_1, \ldots, w_n) > \tau_\Phi$. Where $\tau_\Phi$ is a threshold for the overall phrase score $\alpha_P$, $\alpha_S$ and $\alpha_f$ fare scaling parameters that can be used to give more significance to one of the measures over another, these may be optional.

After the set of significant terms are extracted, method 400 continues can continue to the fourth phase 408 where significant phrase co-occurrences are extracted. Namely, those pairs of phrases that tend to co-occur in the same meaning unit, possible up to some distance. The extraction of significant phrase co-occurrences can begin by, for example, iterating over all meaning units and locating the occurrences of the individual phrases. In certain embodiments longer phrases are preferred over shorter ones. In case of overlapping occurrences of a pair of phrases, only the occurrence of the longer phrases is kept. As used herein, c($\phi$) denotes the number of occurrences of the phrase $\phi$. The number of co-occurrence of pairs of phrases in the same meaning unit is counted. Depending on parameter, one may count only pairs of phrases that are separated by m words at most. As used herein, c($\phi_1$, $\phi_2$) denotes the number of co-occurrences of the phrases $\phi_1$ and $\phi_2$ Depending on another parameter, this counter may or may not be sensitive to order.

Based on the counter values, it is possible to compute the probability p($\phi$) of a phrase and the probability p($\phi_1$,$\phi_2$) of the co-occurrence of a pair of phrases. The log-likelihoods of the co-occurrence of phrases $\phi_1$ and $\phi_2$ can be defined as follows:

$$\ell(\phi_1, \phi_2) = \log \frac{p(\phi_1, \phi_2)}{p(\phi_1) \cdot p(\phi_2)}$$

After calculating the log-likelihoods, phase 408 then identifies a co-occurrence of a pair of phases <$\phi_1$,$\phi_2$> if l($\phi_1$,$\phi_2$)>$\tau_l$, where $\tau_l$ is a log-likelihood threshold.

In summary, the exemplary process 400 described above is capable of extracting a set of significant phrases and a set of significant phrase co-occurrences from an input set of text documents that related to some specific domain. Since phrases must be significantly more prominent in the processed texts with respect to the generic model, the prominence score can help filter very frequency phrases in the language that carry no special significance in the specific domain. Similarly, the stickiness score can help filter false phrases that are induced by an incidental concatenation of a pair of shorter terms. Process 400 can be used in in ontology refining process described in FIG. 1 to automate the identification of a set of significant phrases and significant phrase pairs Referring back to FIG. 1, once the training phase 1 generates and/or updates a refined ontology, the ontology can then be used be by any number of analytics modules or algorithms (see stages 2 and 3 of FIG. 1) to interpret textual transcripts of customer service interactions for example. In this context, the interpretation of these customer service interactions can be used to identify content or meaning of a particular customer service interaction, or may be used across many customer service interactions in order to identify topics, trends, or emerging issues.

Figure 5:
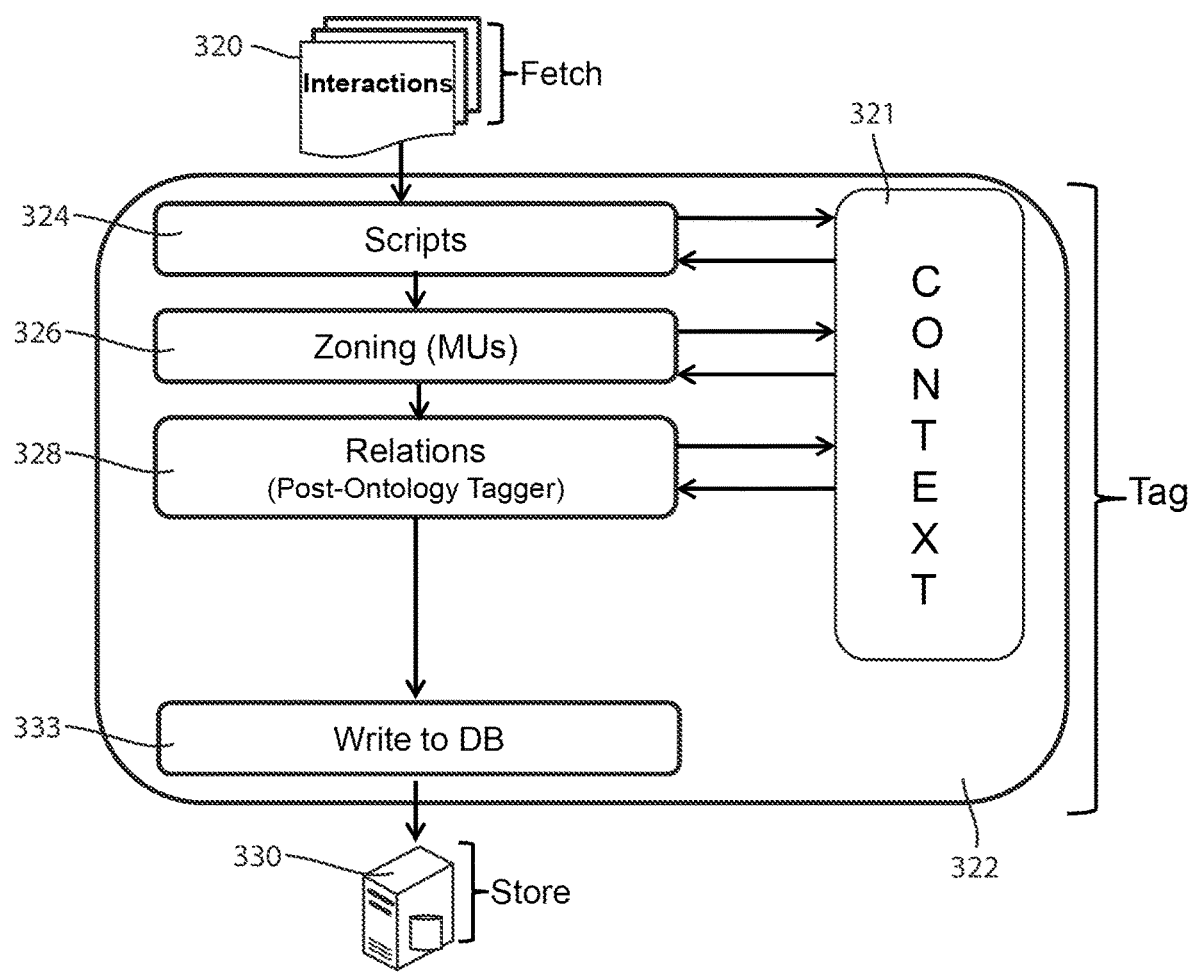
FIG. 5 is a schematic diagram of an embodiment of a process employing an ontology to tag communication data.

More specifically, once the initial ontology 110 has been refined in training stage 1, the system can use a tagging process 2 to tag meaningful elements in incoming communications data, such as transcribed interactions, and then store the tagged data for use by a analytics module 3. In certain embodiments for instance, the tagging process 2 can include loading key ontology data is loaded into the tagging system, and then executing the process depicted at FIG. 5, wherein communications data is fetched 320, tagged 322, and stored 330. Specifically, during the loading stage, the ontology and produced during the training stage 1 is imported into the tagger's internal memory so that they may be used for tagging 2. This data includes ontology data $\langle \mathcal{E}, \mathcal{T}, \mathcal{Z}, \mathcal{X}, \mathcal{A}, \mathcal{R} \rangle$,—i.e., entities, terms, term-entity associations, entity-association rules, abstract relations, and relation instances. The data is used by the tagger during the pipeline process of tagging new, incoming communications data.

Once the refined ontology data has been loaded into the tagger's internal memory, the fetch/tag/store process begins. In the exemplary embodiment of FIG. 5, communication data is fetched 320 from the queue and then tagged 322 in accordance with the entity-association rules set up by the ontology data. More specifically, the tagger retrieves a communication data set, such as the next customer interaction transcript, from the queue, for example using the Post-Processing Framework (PPFW). Depending on the system configurations, the tagger can process several interactions simultaneously. The tagger then tags 322 meaningful elements in the communication data set, such as abstract relations and relation instances 328 defined by the ontology. Optionally, the tagging can include tagging of scripts 324 and/or meaning units 326 (zoning) as well. Optionally, the tagging can include the tagging of terms as well. The tagging and zoning above can be assisted by, for example, method 400. The tagged communications data is then stored 330 in a dedicated database, such as a Sybase IQ database.

In one embodiment, for each data set (or bulk of datasets, depending on the system configuration) the system tags specific elements and then saves the interaction in a temporary repository, the Context module 321. The process tagging process can be repeated for each element—scripts 324, zoning 326 (meaning unit tagging), and relations 328. After the interactions have been tagged with relations 328, the Write to Database module 333 processes the tagged interaction and sends it to the database for storing 330. As described above, the data set can include any number of types and formats of data. For example, the data set may include audio recordings, transcribed audio, email communications, text message communications, etc.

The tagged communications data can then be used to generate any number of analytics 3 (see FIG. 1). For example, the tagged communications data can be processed by a user to develop qualitative and quantitative data about the user company's customer service interactions. This may be done, for instance, via analysis of themes. As described above, themes are groups or abstracts that contain synonymous relations, and they provide users with a compressed view of the characteristics of interactions throughout the data set. As one theme represents a single concept occurring in many different calls, themes provide a summary of the calls. In this way, themes allow users to quickly and easily understand the nature of a multitude of interactions within the call set.

Figure 6:
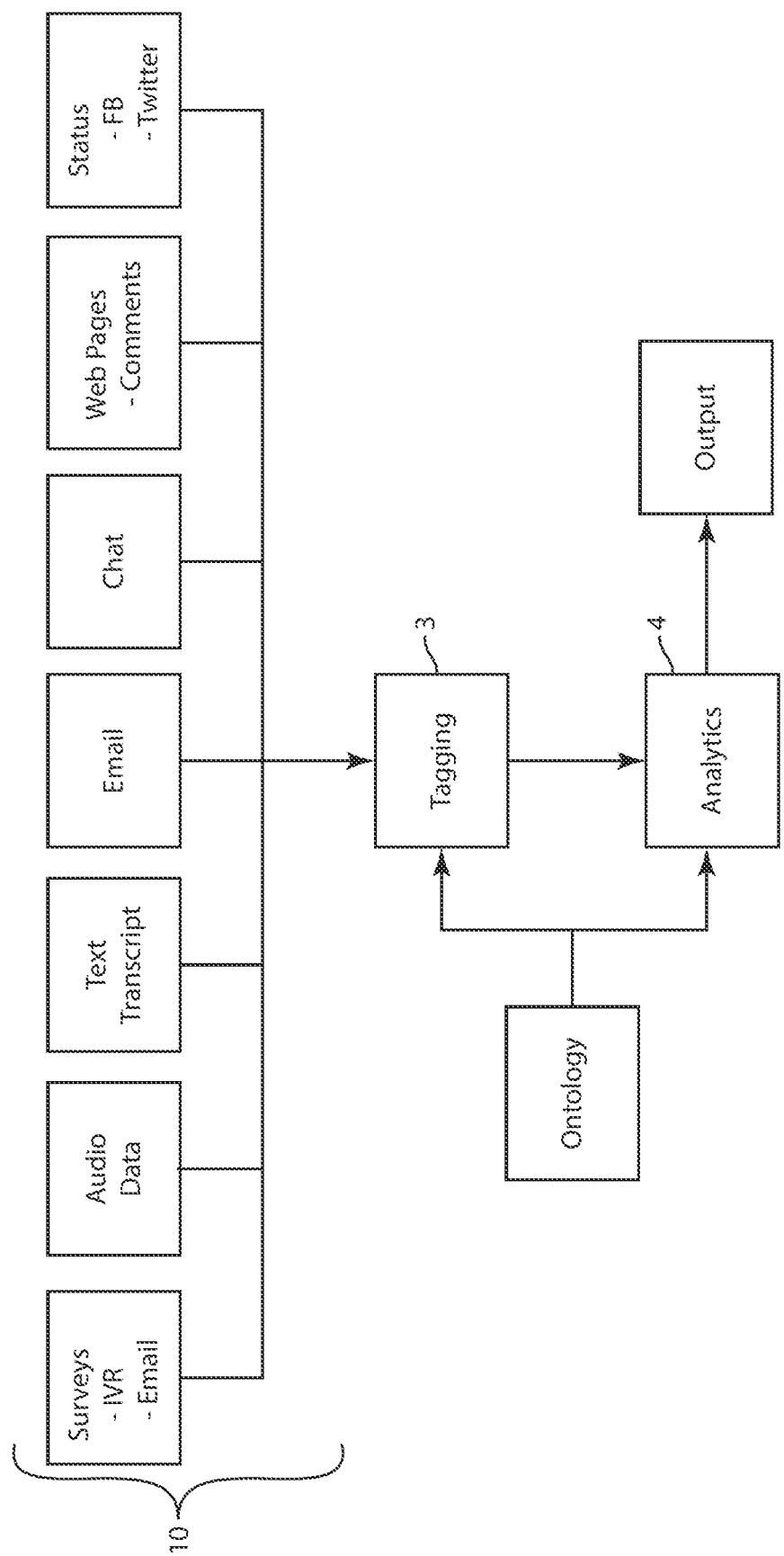
FIG. 6 is an exemplary embodiment of an ontology analytics program incorporating and analyzing multiple data platforms.

Any variety of data can be processed and tagged. FIG. 6 illustrates a flow chart demonstrating one embodiment of a communication data set 10 that can be tagged 2 and analyzed 3 using an ontology refined according to the above-described process. As shown therein, communication data 10 may include, for example, audio data, text transcription, email, chat, web page feedback or comments, social networking interactions (such as via Facebook or Twitter), and customer surveys (e.g. taken via phone or email). For example, in a customer service application or industry, a customer service interaction, or series of interactions, may take place over multiple platforms regarding a certain issue with a particular customer. In a preferred embodiment, all such data can be incorporated and analyzed using the ontology to create a complete picture of the entire customer service system. The communication data 10 is all tagged 2 utilizing the ontology. In a preferred embodiment, the ontology is constructed according to the above described process using a sample dataset that included all types of communication data 10 that will be processed using that ontology because such training may provide a more robust ontology that can account for the linguistic norms of those particular data types. However, the invention also contemplates that a robust ontology may be applied to tag and analyze data types not used in the training of that ontology. Once a communication data set 10 is tagged and analyzed, it is stored and outputted for use and/or review by the user.

Figure 7:
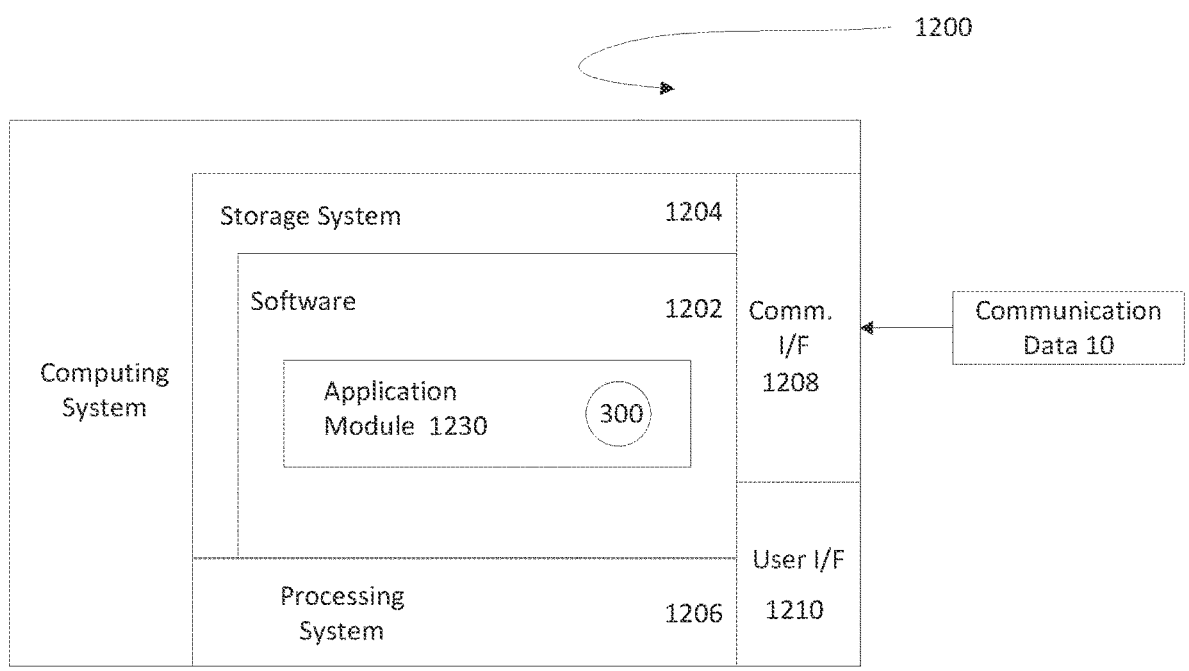
FIG. 7 is a system diagram of an exemplary embodiment of a system for developing an ontology for processing communication data.

FIG. 7 is a system diagram of an exemplary embodiment of a system 1200 for automated language model adaptation implementing an ontology training module 300. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 300 and process 400.

Although the computing system 1200 as depicted in FIG. 7 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium that can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media merely a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio or video data received in real time or near-real time by the computing system 1200.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
providing a set of documents from a source by a computing device;
iterating over the documents of the set of documents to subdivide the documents of the set of documents into a plurality of meaning units by the computing device;
for each meaning unit, determining an associated count for each n-gram that occurs in the meaning unit by the computing device;
for each meaning unit:
  for each n-gram that occurs in the meaning unit:
    computing a prominence score for the n-gram based on the determined count;
    if the prominence score for the n-gram is below a prominence threshold, discarding the n-gram; and
    if the prominence score for the n-gram is not below the prominence threshold:
      if the n-gram is not in a set of candidate n-grams, inserting the n-gram into the set of candidate n-grams and setting the associated count to 1;
      if the n-gram is in the set of candidate n-grams, incrementing the associated count; and
      if the n-gram is in the set of candidate n-grams and the associated count is greater than 1:
        computing a stickiness score for the n-gram; and
        if the stickiness score for the n-gram is below a stickiness threshold, discarding the n-gram from the set of candidate n-grams;

based on the associated count for each n-gram in the set of candidate n-grams, estimating a language-model probability for each n-gram by the computing device;

obtaining a source-specific language model based on the estimated language-model probabilities for each n-gram by the computing device;

loading the source-specific language model into a memory by the computing device;

receiving a plurality of transcribed interactions by the computing device;

tagging the plurality of transcribed interactions using the loaded source-specific language model by the computing device; and generating analytics based on the tagged plurality of transcribed interactions by the computing device.

2. The method of claim 1, wherein the meaning units are sentences.

3. The method of claim 1, wherein the documents are subdivided into meaning using a zoning algorithm.

4. The method of claim 1, wherein determining the associated count for each n-gram that occurs in the meaning unit comprises:
   determining a count for each unigram that occurs in the meaning unit;
   determining a count for each bigram that occurs in the meaning unit; and
   determining a count for each trigram that occurs in the meaning unit.

5. The method of claim 1, further comprising:
   if the stickiness score for the n-gram is not below the stickiness threshold:
      if there is a partially overlapping n-gram in the set of candidate n-grams that has a greater associated count than the n-gram, discarding the n-gram, and
      if there is no partially overlapping n-gram in the set of candidate n-grams that has the greater associated count than the n-gram, incrementing the associated count of the n-gram in the set of candidate n-grams.

6. The method of claim 5, further comprising:
   for each n-gram in the set of candidate n-grams, calculating a phrase score for the n-gram; and
   determining n-grams with a phrase score above a threshold phrase score as significant phrases.

7. A system comprising:
   at least one computing device; and
   a computer-readable medium storing computer-executable instructions that when executed by the at least one computing device cause the system to:
   provide a set of documents from a source;
   iterate over the documents of the set of documents to subdivide the documents of the set of documents into a plurality of meaning units;
   for each meaning unit, determine an associated count for each n-gram that occurs in the meaning unit;
   for each meaning unit:
      for each n-gram that occurs in the meaning unit:
         compute a prominence score for the n-gram based on the determined count;
         if the prominence score for the n-gram is below a prominence threshold, discard the n-gram; and
         if the prominence score for the n-gram is not below the prominence threshold:
            if the n-gram is not in a set of candidate n-grams, insert the n-gram into the set of candidate n-grams and set the associated count to 1;
            if the n-gram is in the set of candidate n-grams, increment the associated count; and
            if the n-gram is in the set of candidate n-grams and the associated count is greater than 1:
               computing a stickiness score for the n-gram; and
               if the stickiness score for the n-gram is below a stickiness threshold, discard the n-gram from the set of candidate n-grams;
   based on the associated count for each n-gram in the set of candidate n-grams, estimate a language-model probability for each n-gram; and
   obtain a source-specific language model based on the estimated language-model probabilities for each n-gram;
   load the source-specific language model into a memory;
   receive a plurality of transcribed interactions;
   tag the plurality of transcribed interactions using the loaded source-specific language model; and
   generate analytics based on the tagged plurality of transcribed interactions.

8. The system of claim 7, wherein the meaning units are sentences.

9. The system of claim 7, wherein the documents are subdivided into meaning using a zoning algorithm.

10. The system of claim 7, wherein determining the associated count for each n-gram that occurs in the meaning unit comprises:
    determining a count for each unigram that occurs in the meaning unit;
    determining a count for each bigram that occurs in the meaning unit; and
    determining a count for each trigram that occurs in the meaning unit.

11. The system of claim 7, further comprising computer-executable instructions that when executed by the at least one computing device cause the system to:
    if the stickiness score for the n-gram is not below the stickiness threshold:
       if there is a partially overlapping n-gram in the set of candidate n-grams that has a greater associated count than the n-gram, discard the n-gram, and
       if there is no partially overlapping n-gram in the set of candidate n-grams that has the greater associated count than the n-gram, incrementing the associated count of the n-gram in the set of candidate n-grams.

12. The system of claim 11, further comprising computer-executable instructions that when executed by the at least one computing device cause the system to:
    for each n-gram in the set of candidate n-grams, calculate a phrase score for the n-gram;
    determine n-grams with a phrase score above a threshold phrase score as significant phrases.

13. A non-transitory computer-readable medium storing computer-executable instructions that when executed by at least one computing device cause a system to:
    provide a generic language model;
    provide a set of documents from a source;
    iterate over the documents of the set of documents to subdivide the documents of the set of documents into a plurality of meaning units;
    for each meaning unit, determine an associated count for each n-gram that occurs in the meaning unit;
    for each meaning unit:
       for each n-gram that occurs in the meaning unit:
          compute a prominence score for the n-gram based on the determined count;
          if the prominence score for the n-gram is below a prominence threshold, discard the n-gram; and if the prominence score for the n-gram is not below the prominence threshold:
   if the n-gram is not in a set of candidate n-grams, insert the n-gram into the set of candidate n-grams and set the associated count to 1;
   if the n-gram is in the set of candidate n-grams, increment the associated count; and
   if the n-gram is in the set of candidate n-grams and the associated count is greater than 1:
      computing a stickiness score for the n-gram; and
if the stickiness score for the n-gram is below a stickiness threshold, discard the n-gram from the set of candidate n-grams;
based on the associated count for each n-gram in the set of candidate n-grams, estimate a language-model probability for each n-gram; and
obtain a source-specific language model based on the estimated language-model probabilities for each n-gram;
load the source-specific language model into a memory;
receive a plurality of transcribed interactions;
tag the plurality of transcribed interactions using the loaded source-specific language model; and
generate analytics based on the tagged plurality of transcribed interactions.

14. The computer-readable medium of claim 13, wherein the meaning units are sentences.

15. The computer-readable medium of claim 13, wherein the documents are subdivided into meaning using a zoning algorithm.

16. The computer-readable medium of claim 13, wherein determining the associated count for each n-gram that occurs in the meaning unit comprises:
   determining a count for each unigram that occurs in the meaning unit;
   determining a count for each bigram that occurs in the meaning unit; and
   determining a count for each trigram that occurs in the meaning unit.

17. The computer-readable medium of claim 13, further comprising computer-executable instructions that when executed by the at least one computing device cause the system to:
   if the stickiness score for the n-gram is not below the stickiness threshold:
      if there is a partially overlapping n-gram in the set of candidate n-grams that has a greater count than the n-gram, discard the n-gram, and
      if there is no partially overlapping n-gram in the set of candidate n-grams that has the greater count than the n-gram, increment the count associated with the n-gram in the set of candidate n-grams.

18. The computer-readable medium of claim 17, further comprising:
   for each n-gram in the set of candidate n-grams, calculate a phrase score for the n-gram;
   determine n-grams with a phrase score above a threshold phrase score as significant phrases.

* * * * *